Dec. 16, 1924.
F. McCOLLUM, JR
1,519,688
ANTISKID DEVICE
Filed March 1, 1923
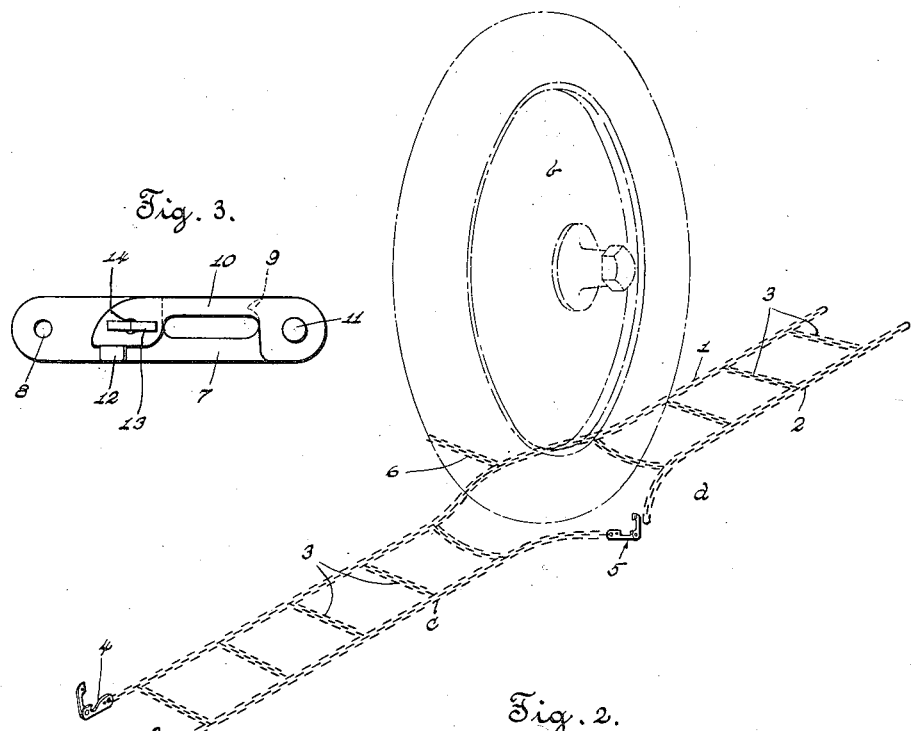
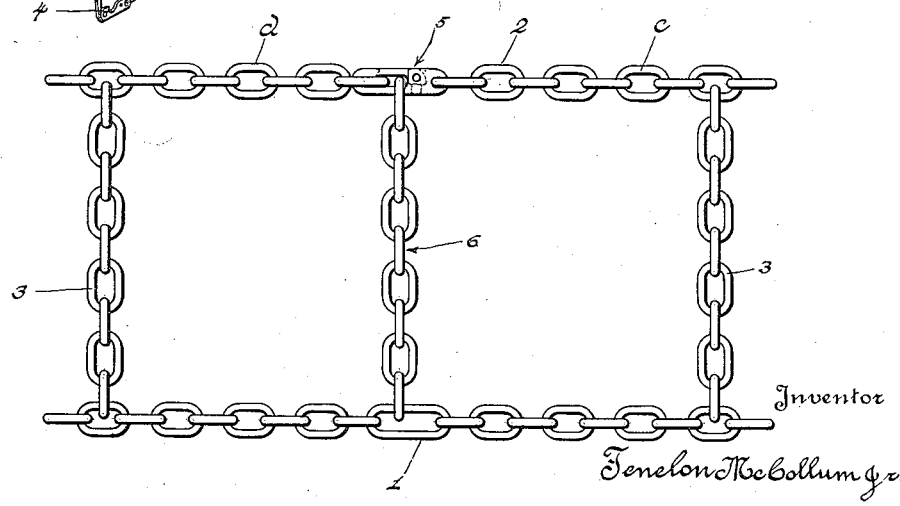

Patented Dec. 16, 1924.

1,519,688

UNITED STATES PATENT OFFICE.

FENELON McCOLLUM, JR., OF MANSFIELD DEPOT, CONNECTICUT.

ANTISKID DEVICE.

Application filed March 1, 1923. Serial No. 622,005.

*To all whom it may concern:*

Be it known that I, FENELON McCOLLUM, Jr., a citizen of the United States, and a resident of Mansfield Depot, county of Tolland, State of Connecticut, have invented certain new and useful Improvements in Antiskid Devices, of which the following is a specification.

This invention relates to anti-skid chains for automobile wheels and the like.

One object of the invention is to provide an improved construction and arrangement of parts for an anti-skid chain.

Another object of the invention is to provide an improved anti-skid chain which may be quickly and easily attached to an automobile wheel without raising the wheel from the ground or rotating it.

Other objects will be in part obvious and in part pointed out hereinafter.

The invention accordingly consists in the features of construction, combinations of elements, and arrangement of parts which will be exemplified in the construction hereinafter set forth and the scope of the application of which will be indicated in the appended claims.

In the drawing forming a part of this specification, and in which similar reference characters refer to similar parts:

Fig. 1 shows the arrangement of parts of a practical embodiment of the chain and indicates the manner of placing the same on an automobile or similar wheel;

Fig. 2 is an enlarged view of a section of the chain and illustrates the manner in which certain of the parts are detachably connected together; and Fig. 3 is a view, in side elevation, of an attachment hook or link for connecting certain of the parts or sections of the chain together.

Referring to the drawings, and more particularly to Fig. 1, the anti-skid device or chain is of the type which has a pair of side chains 1 and 2 which are adapted to lie or extend generally circumferentially of the wheel $b$ normally assuming a position at the sides of the tire. The side chains 1 and 2 are connected by cross chains 3 which are composed of links of any suitable type for best assuming the wear of the road surface thereagainst. In referring to Fig. 2, it is understood that the links, both of the side chains and the cross chains, are shown in the simplest form, merely by way of illustration, and that any suitable form of link may be substituted or used in place of these simple links, the form of links not being the subject matter of the invention. For the purpose of making the chain detachable from the wheel $b$, the side chains 1 and 2 are not continuous, but are provided at an end of each with a hook 4 for hooking together the ends after the chain has been placed around the periphery of the tire.

The usual practice in putting on chains of this general type is to jack up the wheel, inserting the chain beneath the wheel, and then hooking the ends together by means of hooks, such as 4. Another way of attaching the chain is to lay the chain on the ground, stretched out, and then to roll the wheel thereover to a generally central position on the chain, and then wrap the chain about the wheel, hooking it as before described. Under certain circumstances, this is not only inconvenient but almost impossible. For instance, when the wheel is in a deep rut, the chain cannot be laid out in such a manner as to roll the wheel back thereover and hook the ends together. This difficulty is often worse when the wheel is in a snowbank or on an icy pavement. Often, in such cases, the car cannot be moved at all under its own power, and there is great inconvenience in placing a jack under the car to raise the wheel.

In the present embodiment, these difficulties are obviated by forming the chain 2 in two sections $c$ and $d$ which can be detachably fastened or joined by a hook 5 somewhat similar in character to the hooks 4. This hook 5 also provides a means for securing one end of a cross chain 6 to the side chain 2. This construction greatly facilitates the placing of the chain onto the tire of the wheel, as indicated at $b$.

The chain is placed on the wheel as follows. The side chain 1 is laid at one side of the wheel, preferably on the inner side, and then with the cross chain 6 lying in an out of the way position, the two ends of the sections $c$ and $d$ are joined together on the opposite side of the tire by means of the hook 5, leaving the cross chain 6 detached. The chain is then in the same position that it would have assumed if the wheel had been run over the chain in the direction of its length. The ends of the chain are then hooked together in the usual manner by means of the hooks 4, after which power may be applied to the wheel $b$ to extricate the car from the rut or other difficulty. Thereafter, the hook 5 is again opened and the end of the cross chain 6 is joined thereat through the side chain 2.

The operation of placing the chain on a wheel is a matter of very few minutes as compared with the extremely difficult, dirty and lengthy task of placing the usual form of chain on a wheel under similar circumstances.

The preferred form of hook, which I use for connecting the sections $c$ and $d$ of the chain 2 together and to the end of the cross chain 6, is shown in Fig. 3. This hook consists of a hook portion 7 provided at one end with an aperture 8 to receive a link to which it is permanently attached, and a hook end 9 shown in dotted lines which assumes the strain from one of the links to which the hook is to be detachably connected. The reduced section between the two ends of the portion 7 is adapted to receive the strain from the other link, in this case the end link of the cross chain 6. The hook is closed against accidental removal of the links therefrom by a guard member 10 pivotally mounted as at 11 at the free end of the hook portion 7 and adapted to swing into and out of closed position against a projecting stop member 12 adjacent its free end. When the guard is in this closed position, a cotter pin or other suitable device, indicated at 13, may be inserted through alined apertures 14 in the guard and the hook portion 7.

This construction forms a very strong hook in which there is practically no tendency to open under any strain which it would ordinarily receive.

Thus, by the above construction, are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

I claim as my invention:

1. An anti-skid chain comprising a pair of side chains and a plurality of spaced cross chains connecting the side chains, one of the cross chains being detachable from one of the side chains, one of the side chains also being detachably linked together adjacent said detachable cross chain.

2. An anti-skid chain having a pair of side chains one of which is in two sections, a plurality of cross chains connecting the side chains, and a detachable link for joining said two sections and one of the cross chains.

3. An anti-skid chain having a pair of side chains one of which is in two sections, a plurality of cross chains connecting the side chains, and means for detachably joining said two sections and one of the cross chains.

4. An anti-skid device for automobile tires and the like comprising two members arranged to extend generally circumferentially at the sides of the tire, cross members adapted to lie across the tire and connected with the circumferential members being held in position thereby, and a detachable connector joining two ends of one of the circumferential members and an end of a cross member.

FENELON McCOLLUM, Jr.